United States Patent
Nagano et al.

(10) Patent No.: US 12,338,354 B2
(45) Date of Patent: Jun. 24, 2025

(54) AQUEOUS PIGMENT DISPERSION

(71) Applicant: KAO CORPORATION, Tokyo (JP)

(72) Inventors: Tomohiko Nagano, Wakayama (JP); Hiroto Soma, Wakayama (JP); Shu Nagashima, Wakayama (JP)

(73) Assignee: KAO CORPORATION, Tokyo (JP)

(*) Notice: Subject to any disclaimer, the term of this patent is extended or adjusted under 35 U.S.C. 154(b) by 205 days.

(21) Appl. No.: 18/254,061

(22) PCT Filed: Nov. 25, 2021

(86) PCT No.: PCT/JP2021/043145
§ 371 (c)(1),
(2) Date: May 23, 2023

(87) PCT Pub. No.: WO2022/114048
PCT Pub. Date: Jun. 2, 2022

(65) Prior Publication Data
US 2023/0407118 A1    Dec. 21, 2023

(30) Foreign Application Priority Data
Nov. 27, 2020  (JP) ................. 2020-197103

(51) Int. Cl.
*C09D 11/322* (2014.01)
*C09D 7/40* (2018.01)
*C09D 7/65* (2018.01)
*C09D 167/02* (2006.01)
*B41J 2/01* (2006.01)

(52) U.S. Cl.
CPC ......... *C09D 11/322* (2013.01); *C09D 7/65* (2018.01); *C09D 7/67* (2018.01); *C09D 7/68* (2018.01); *C09D 167/025* (2013.01); *B41J 2/01* (2013.01)

(58) Field of Classification Search
CPC ... B41J 2/175; B41J 27/00; B41J 2/14; C09D 11/322; C09D 11/104; C09D 17/001; C09D 7/65; C09D 7/67; C09D 7/68; C09D 167/025
See application file for complete search history.

(56) References Cited

U.S. PATENT DOCUMENTS

| | | | | |
|---|---|---|---|---|
| 11,407,911 B2 * | 8/2022 | Kawakami | ............ | C09D 11/38 |
| 2012/0329931 A1 * | 12/2012 | Buei | .................... | C09D 11/326 |
| | | | | 524/401 |
| 2019/0270898 A1 | 9/2019 | Maeda | | |
| 2020/0332135 A1 | 10/2020 | Kawaguchi | | |

FOREIGN PATENT DOCUMENTS

| | | |
|---|---|---|
| CN | 104995224 A | 10/2015 |
| CN | 109312182 A | 2/2019 |
| CN | 111542571 A | 8/2020 |
| JP | 2002-60656 A | 2/2002 |
| JP | 2002-256200 A | 9/2002 |
| JP | 2005-200497 A | 7/2005 |
| JP | 2006-257317 A | 9/2006 |
| JP | 2014-88552 A | 5/2014 |
| JP | 2015-28114 A | 2/2015 |
| JP | 2016-113542 A | 6/2016 |
| JP | 2016-196619 A | 11/2016 |
| JP | 2017-25263 A | 2/2017 |
| JP | 2019-99819 A | 6/2019 |
| JP | 2019-119789 A | 7/2019 |

OTHER PUBLICATIONS

International Search Report issued Jan. 25, 2022 in PCT/JP2021/043145 filed Nov. 25, 2021, 2 pages.
Extended European Search Report issued Oct. 17, 2024, in European Patent Application No. 21898020.9, 5 pages.

* cited by examiner

*Primary Examiner* — Thinh H Nguyen
(74) *Attorney, Agent, or Firm* — Oblon, McClelland, Maier & Neustadt, L.L.P.

(57) ABSTRACT

A pigment water dispersion including pigment-containing polyester resin particles. An alcohol component as a raw material monomer of the polyester resin satisfies the following conditions 1 and 2. Condition 1: a content of a compound (I) represented by the following formula (I) in the alcohol component is not more than 7 mol %,

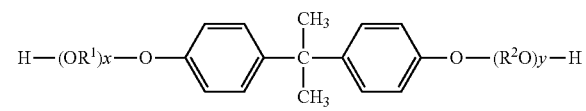

(I)

wherein $OR^1$ and $R^2O$ are each independently an oxyalkylene group comprising not less than 1 and not more than 4 carbon atoms, and x and y are each independently a positive number of not less than 0. Condition 2: a content of a compound (II) comprising two secondary hydroxy groups except for the compound (I) in the alcohol component is not less than 45 mol %.

20 Claims, No Drawings

AQUEOUS PIGMENT DISPERSION

CROSS REFERENCE TO RELATED APPLICATIONS

This application is a National Stage entry under 35 U.S.C. § 371 of PCT/JP2021/043145, filed on Nov. 25, 2021, and claims priority to Japanese Patent Application No. 2020-197103, filed on Nov. 27, 2020. The entire contents of both are incorporated herein by reference.

FIELD OF THE INVENTION

The present invention relates to a pigment water dispersion, and a water-based ink for ink-jet printing containing the pigment water dispersion.

BACKGROUND OF THE INVENTION

In ink-jet printing methods, droplets of ink are directly ejected from very fine nozzles and allowed to adhere to a printing medium to obtain printed characters or images thereon. The ink-jet printing methods have become rapidly spread because of various advantages such as easiness of full coloration, low cost, capability of using a plain paper as the printing medium, non-contact with the printed characters or images, etc.

In recent years, from the standpoint of imparting good weather resistance or water resistance to a printed material as well as from the standpoint of reducing a burden on working environments and natural environments, there have been noticed water-based pigment inks in which a pigment is used as a colorant and dispersed in the inks with a polymer. On the other hand, the water-based pigment inks have posed such a problem that the inks are deteriorated in storage stability or ejection stability owing to the existence of coarse particles derived from the pigment or the polymer in the inks.

Under these circumstances, various proposals have been made in order to improve storage stability or ejection stability of the inks.

For example, JP 2002-60656A (Patent Literature 1) discloses, as an aqueous pigment ink for ink-jet printing which is excellent in long-term storage stability, in particular, excellent in intermittent ejection stability after interruption of printing as well as storage/ejection stability upon using an ink reservoir and a print head again after allowing them to stand in such a state as detached from each other for a long period of time, and is capable of stably printing images having good quality, a pigment ink for ink-jet printing which contains a pigment and an aqueous polyester copolymer.

SUMMARY OF THE INVENTION

The present invention relates to a pigment water dispersion containing pigment-containing polyester resin particles, in which:

an alcohol component as a raw material monomer of the polyester resin satisfies the following conditions 1 and 2, Condition 1: a content of a compound (I) represented by the following formula (I) in the alcohol component is not more than 7 mol %,

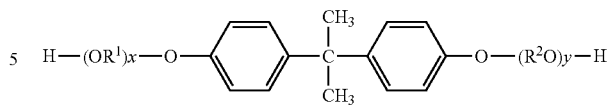

wherein $OR^1$ and $R^2O$ are each independently an oxyalkylene group having not less than 1 and not more than 4 carbon atoms, and x and y are each independently a positive number of not less than 0; and Condition 2: a content of a compound (II) containing two secondary hydroxy groups except for the compound (I) in the alcohol component is not less than 45 mol %.

DETAILED DESCRIPTION OF THE INVENTION

In the commercial and industrial printing application fields, ink is generally supplied to ejection nozzles through a main tank, a secondary tank and an ink cartridge. The ink accommodated in the main tank tends to be frequently allowed to stand for a long period of time. For this reason, there tends to occur such a problem that, in particular, after interrupting the printing operation for a long period of time, the ink suffers from deterioration in ejection properties upon ejecting the ink again for conducting the printing (hereinafter also referred to as "ejection stability").

On the other hand, when conducting the printing on a low-liquid absorbing coated paper, a non-liquid absorbing resin film or the like, the ink tends to be hardly penetrated into these substrates, so that there tends to occur such a problem that the resulting printed material is deteriorated in rub fastness.

The conventional water-based inks as described in the Patent Literature 1, etc., tend to be insufficient in ejection stability, and a printed material obtained using the inks tends to be insufficient in rub fastness. Therefore, it has been required that the conventional water-based inks are further improved in properties thereof.

The present invention relates to a pigment water dispersion that is excellent in storage stability, and a water-based ink for ink-jet printing which is excellent in ejection stability after allowing the ink to stand for a long period of time, and is capable of providing a printed material having excellent rub fastness.

The present inventors have found that by using a polyester resin that contains a constitutional unit derived from a compound (II) containing two secondary hydroxy groups as a pigment-dispersing polymer, the resulting ink is free of inclusion of coarse particles owing to flocculation of the ink even after being stored for a long period of time, so that it is possible to solve the aforementioned conventional problems.

That is, the present invention relates to the following aspects [1] and [2].

[1] A pigment water dispersion containing pigment-containing polyester resin particles, in which:

an alcohol component as a raw material monomer of the polyester resin satisfies the following conditions 1 and 2, Condition 1: a content of a compound (I) represented by the following formula (I) in the alcohol component is not more than 7 mol %,

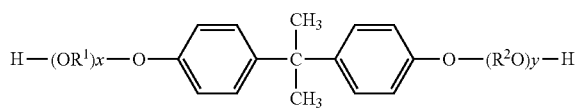

wherein $OR^1$ and $R^2O$ are each independently an oxyalkylene group having not less than 1 and not more than 4 carbon atoms, and x and y are each independently a positive number of not less than 0; and Condition 2: a content of a compound (II) containing two secondary hydroxy groups except for the compound (I) in the alcohol component is not less than 45 mol %.

[2] A water-based ink containing the pigment water dispersion described in the above [1].

In accordance with the present invention, it is possible to provide a pigment water dispersion that is excellent in storage stability, and a water-based ink for ink-jet printing which is excellent in ejection stability after allowing the ink to stand for a long period of time, and is capable of providing a printed material having excellent rub fastness.

[Pigment Water Dispersion]

The pigment water dispersion of the present invention contains pigment-containing polyester resin particles, in which:

an alcohol component (hydroxy group-containing component) as a raw material monomer (constituent monomer) of the polyester resin satisfies the following conditions 1 and 2, Condition 1: a content of a compound (I) represented by the following formula (I) in the alcohol component is not more than 7 mol %,

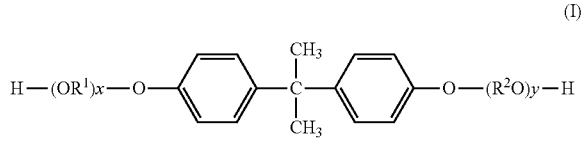

wherein $OR^1$ and $R^2O$ are each independently an oxyalkylene group having not less than 1 and not more than 4 carbon atoms, and x and y are each independently a positive number of not less than 0; and Condition 2: a content of a compound (II) containing two secondary hydroxy groups except for the compound (I) in the alcohol component is not less than 45 mol %.

Meanwhile, the term "printing" as used in the present specification means a concept that includes printing or typing operation for printing characters or images, and the term "printed material" as used in the present specification means a concept that includes printed matters or typed materials on which characters or images are printed.

The pigment water dispersion and the water-based ink for ink-jet printing according to the present invention are excellent in storage stability as well as ejection stability after allowing them to stand for a long period of time, and a printed material obtained using the pigment water dispersion or the water-based ink is also excellent in rub fastness. The reason why the aforementioned advantageous effects can be attained by the present invention is considered as follows though it is not clearly determined yet.

When an aromatic ring-containing compound such as bisphenol A is used as an alcohol component among constitutional units of the polyester resin, the obtained polyester resin tends to have a hydrophobic rigid structure. For this reason, it is considered that such a polyester resin tends to fail to uniformly cover the pigment therewith, so that the bare pigment particles tend to suffer from collision and flocculation during long-term storage to thereby form coarse particles thereof.

On the other hand, the polyester resin obtained using an alcohol component containing no aromatic ring as a constitutional unit thereof has a soft structure and is therefore capable of uniformly covering the pigment therewith. However, the polyester resin becomes comparatively hydrophilic, and besides the carbon-carbon bond in the polyester resin is likely to rotate, and the molecular chain of the polyester resin has high motility, so that desorption of the polymer from the pigment tends to proceed. For this reason, it is considered that when such pigment-containing polyester resin particles are stored for a long period of time, the surface of the pigment tends to be partially exposed outside owing to desorption of the polymer from the pigment. As a result, it is considered that when the exposed pigment particles are collided with each other, flocculation of the pigment particles tends to proceed to thereby form coarse particles thereof.

To the contrary, the polyester resin obtained using the compound (II) containing two secondary hydroxy groups as the constitutional unit thereof is excellent in not only balance between hardness and softness, but also in hydrophile-lipophile balance owing to the presence of the carbon atoms having a branched structure therein. For this reason, it is considered that it is possible not only to uniformly cover the pigment with the polymer when producing the pigment-containing polyester resin particles, but also to form a stable pigment water dispersion without desorption of the polymer from the pigment even when being stored for a long period of time. As a result, it is considered that the resulting pigment water dispersion or water-based ink is excellent in storage stability and ejection stability and is capable of providing a printed material having excellent rub fastness.

<Pigment-Containing Polyester Resin Particles>

The pigment used in the present invention is contained in the pigment water dispersion or the water-based ink in the form of pigment-containing polyester resin particles from the viewpoint of improving storage stability and ejection stability of the resulting pigment water dispersion or water-based ink.

The "pigment-containing polyester resin particles" as used in the present specification include particles having a configuration in which the pigment is incorporated in the polyester resin, particles having a configuration in which the pigment is partially exposed to a surface of respective particles formed of the polyester resin and the pigment, particles having a configuration in which the polymer is adsorbed to a part of the pigment, and the like. Among these configurations of the particles, preferred is the configuration of the polyester resin particles into which the pigment is incorporated.

[Pigment]

The pigment used in the present invention may be either an inorganic pigment or an organic pigment, and may also be used in the form of a lake pigment or a fluorescent pigment. In addition, the inorganic or organic pigment may also be used in combination with an extender pigment, if required.

Specific examples of the inorganic pigment include carbon blacks, metal oxides, such as titanium oxide, iron oxide, red iron oxide, chromium oxide, etc., iridescent nacreous pigments, and the like. In particular, the carbon blacks are preferably used for black inks. Examples of the carbon blacks include furnace blacks, lamp blacks, acetylene blacks, channel blacks and the like.

Specific examples of the organic pigment include azo pigments, such as azo lake pigments, insoluble monoazo pigments, insoluble disazo pigments, chelate azo pigments, etc.; polycyclic pigments, such as phthalocyanine pigments, perylene pigments, perinone pigments, anthraquinone pigments, quinacridone pigments, dioxazine pigments, thioindigo pigments, isoindolinone pigments, quinophthalone pigments, diketopyrrolopyrrole pigments, benzimidazolone pigments, threne pigments, etc.; and the like.

The hue of the pigment is not particularly limited, and there may be used any of achromatic color pigments, such as a white pigment, a black pigment, a gray pigment, etc.; and chromatic color pigments, such as a yellow pigment, a magenta pigment, a cyan pigment, a blue pigment, a red pigment, an orange pigment, a green pigment, etc.

Specific examples of the preferred organic pigments include one or more pigments selected from the group consisting of commercially available products marketed under the names of C.I. Pigment Yellow, C.I. Pigment Red, C.I. Pigment Orange, C.I. Pigment Violet, C.I. Pigment Blue and C.I. Pigment Green with various part numbers.

Examples of the extender pigment include silica, calcium carbonate, talc and the like.

The aforementioned pigments may be used alone or in the form of a mixture of any two or more thereof.

[Polymer a Constituting Pigment-Containing Polyester Resin Particles]

The polymer a constituting the pigment-containing polyester resin particles (hereinafter also referred to merely as a "polymer a") is not particularly limited as long as the polymer has at least an ability of dispersing the pigment. The polymer a is preferably in the form of a water-insoluble polymer.

The term "water-insoluble" of the polymer a as used herein means that when the polymer is dried to a constant weight at 105° C. for 2 hours and then dissolved in 100 g of water at 25° C., the solubility in water of the polymer is not more than 10 g. The solubility in water of the polymer a is preferably not more than 5 g, and more preferably not more than 1 g. In the case where the polymer a is an anionic polymer, the aforementioned solubility means a solubility in water of the polymer a whose anionic groups are neutralized completely (i.e., 100%) with sodium hydroxide.

[Polyester Resin]

The polyester resin used in the present invention contains a constitutional unit derived from an alcohol component and a constitutional unit derived from a carboxylic acid component, and may be obtained by subjecting the alcohol component and the carboxylic acid component to polycondensation reaction.

(Alcohol Component)

In the present invention, the alcohol component satisfies the following conditions 1 and 2, Condition 1: a content of the compound (I) represented by the aforementioned formula (I) in the alcohol component is not more than 7 mol %; and Condition 2: a content of a compound (II) containing two secondary hydroxy groups except for the compound (I) in the alcohol component is not less than 45 mol %.

(Condition 1)

In the present invention, the alcohol component may contain an aromatic diol. However, from the viewpoint of improving storage stability, ejection stability and rub fastness of the resulting pigment water dispersion or water-based ink, the content of the compound (I) represented by the below-mentioned formula (I) in the alcohol component is not more than 7 mol %. The content (mol %) of the compound (I) as used herein means a ratio of a molar number of the compound (I) to a molar number of compounds included in the alcohol component constituting the polyester resin.

The compound (I) is an alkyleneoxide adduct of bisphenol A having such a structure that an oxyalkylene group(s) is added to 2,2-bis(4-hydroxyphenyl)propane.

In the present invention, it is preferred that no other aromatic diol is contained as the alcohol component.

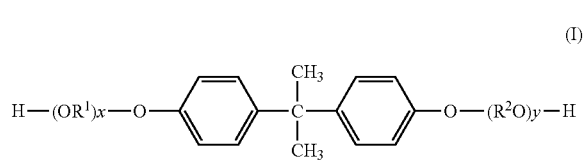

In the general formula (I), $OR^1$ and $R^2O$ are each independently an oxyalkylene group having not less than 1 and not more than 4 carbon atoms, and preferably an oxyethylene group or an oxypropylene group.

The suffixes x and y each represent a molar number of addition of the alkyleneoxide, and are each independently a positive number of not less than 0. From the viewpoint of attaining good reactivity with the carboxylic acid component, an average value of sums of x and y is preferably not less than 2, and is also preferably not more than 7, more preferably not more than 5 and even more preferably not more than 4.

In addition, the $OR^1$ groups and the $R^2O$ groups may be respectively the same or different from each other. From the viewpoint of improving storage stability, ejection stability and rub fastness of the resulting pigment water dispersion or water-based ink, the $R^1O$ groups and the $R^2O$ groups are respectively preferably identical to each other.

As the alkyleneoxide adduct of bisphenol A, preferred are a propyleneoxide adduct of bisphenol A and an ethyleneoxide adduct of bisphenol A, and more preferred is a propyleneoxide adduct of bisphenol A.

From the viewpoint of improving storage stability, ejection stability and rub fastness of the resulting pigment water dispersion or water-based ink, the content of the aforementioned compound (I) in the alcohol component is not more than 7 mol %, preferably not more than 5 mol %, more preferably not more than 3 mol %, even more preferably not more than 1 mol %, and it is further even more preferred that the alcohol component contains no compound (I).

(Condition 2)

In the present invention, from the viewpoint of improving storage stability, ejection stability and rub fastness of the resulting pigment water dispersion or water-based ink, the content (mol %) of the compound (II) containing two secondary hydroxy groups except for the compound (I) in the alcohol component is not less than 45 mol %. The content of the compound (II) containing two secondary hydroxy groups except for the compound (I) as used herein means a ratio of a molar number of the compound (II) to a molar number of compounds included in the alcohol component constituting the polyester resin.

From the same viewpoint as described above, the molecular weight of the compound (II) is preferably not more than 500, more preferably not more than 400 and even more preferably not more than 300, and is also preferably not less than 90.

As the specific examples of the compound (II), preferred is at least one compound selected from the group consisting of 2,3-butanediol, 2,4-pentanediol, 2,5-hexanediol, 2,6-heptanediol, 2,7-octanediol, 1,4-cyclohexanediol and hydrogenated bisphenol A, and more preferred is at least one compound selected from the group consisting of 2,3-butanediol, 2,5-hexanediol, 1,4-cyclohexanediol and hydrogenated bisphenol A (2,2'-bis(4-hydroxycyclohexyl)propane).

From the same viewpoint as described above, the content of the compound (II) in the alcohol component is not less than 45 mol %, preferably not less than 60 mol %, more preferably not less than 80 mol %, even more preferably not less than 90 mol %, and further even more preferably not less than 95 mol %.

The aforementioned carboxylic acid components may be used alone or in combination of any two or more thereof.

(Carboxylic Acid Component)

Examples of the carboxylic acid component as a raw material monomer of the polyester resin used in present invention include carboxylic acids as well as anhydrides and alkyl (having not less than 1 and not more than 3 carbon atoms) esters of these carboxylic acids, and the like.

Specific examples of the carboxylic acid component include an aromatic dicarboxylic acid, an aliphatic dicarboxylic acid, an alicyclic dicarboxylic acid, and a trivalent or higher-valent polycarboxylic acid.

As the aromatic dicarboxylic acid, preferred are phthalic acid, isophthalic acid and terephthalic acid, and more preferred is terephthalic acid.

Examples of the aliphatic dicarboxylic acid include an unsaturated aliphatic dicarboxylic acid and a saturated aliphatic dicarboxylic acid. As the unsaturated aliphatic dicarboxylic acid, preferred are fumaric acid and maleic acid, and more preferred is fumaric acid. As the saturated aliphatic dicarboxylic acid, preferred are adipic acid and succinic acid, and more preferred is adipic acid.

As the alicyclic dicarboxylic acid, preferred are cyclohexanedicarboxylic acid, decalinedicarboxylic acid and tetrahydrophthalic acid.

As the trivalent or higher-valent polycarboxylic acid, preferred are trimellitic acid and pyromellitic acid, and trimellitic anhydride is also preferably used.

The aforementioned carboxylic acid components may be used alone or in combination of any two or more thereof.

From the viewpoint of improving storage stability, ejection stability and rub fastness of the resulting pigment water dispersion or water-based ink, the aforementioned carboxylic acid component preferably includes at least one compound selected from the group consisting of an aromatic dicarboxylic acid, an aliphatic dicarboxylic acid and a trivalent or higher-valent polycarboxylic acid, and more preferably includes a combination of an aromatic dicarboxylic acid and a trivalent or higher-valent polycarboxylic acid.

(Production of Polyester Resin)

The polyester resin used in the present invention may be obtained by adequately combining the alcohol component and the carboxylic acid component with each other and subjecting these components to polycondensation reaction. The polyester resin may be produced, for example, by subjecting the alcohol component and the carboxylic acid component to polycondensation reaction at a temperature of not lower than 150° C. and not higher than 250° C. in an inert gas atmosphere, if required in the presence of an esterification catalyst.

Examples of the esterification catalyst include a tin catalyst, a titanium catalyst, a metal compound, such as antimony trioxide, zinc acetate, germanium dioxide, etc., and the like. Of these esterification catalysts, the tin catalyst is preferably used from the viewpoint of attaining a high esterification reaction efficiency. As the tin catalyst, preferred are dibutyl tin oxide, tin (II) 2-ethyl hexanoate, salts of these compounds, and the like, and more preferred is tin (II) 2-ethyl hexanoate. If required, there may be further used an esterification co-catalyst, such as gallic acid, etc.

In addition, a radical polymerization inhibitor, such as 4-tert-butyl catechol, etc., may also be used in combination with the aforementioned components.

The polyester resin preferably contains acid groups from the viewpoint of improving storage stability, ejection stability and rub fastness of the resulting pigment water dispersion or water-based ink.

The acid value of the polyester resin is preferably not less than 10 mgKOH/g, more preferably not less than 15 mgKOH/g and even more preferably not less than 17 mgKOH/g, and is also preferably not more than 100 mgKOH/g, more preferably not more than 80 mgKOH/g, even more preferably not more than 60 mgKOH/g and further even more preferably not more than 40 mgKOH/g.

From the same viewpoint as described above, the softening point of the polyester resin is preferably not lower than 90° C., more preferably not lower than 100° C. and even ore preferably not lower than 110° C., and is also preferably not higher than 180° C., more preferably not higher than 160° C. and even more preferably not higher than 150° C.

From the same viewpoint as described above, the glass transition temperature of the polyester resin is preferably not lower than 50° C., more preferably not lower than 52° C. and even ore preferably not lower than 55° C., and is also preferably not higher than 100° C., more preferably not higher than 98° C. and even more preferably not higher than 95° C.

From the same viewpoint as described above, the weight-average molecular weight of the polyester resin is preferably not less than 5,000, more preferably not less than 10,000 and even more preferably not less than 12,000, and is also preferably not more than 100,000, more preferably not more than 80,000 and even more preferably not more than 60,000.

The acid value, the softening point, the glass transition temperature and the weight-average molecular weight (Mw) of the polyester resin may be measured by the respective methods described in Examples below. In addition, these properties may be respectively adjusted to desired values by appropriately controlling the kinds and compounding ratios of the raw material monomers used as well as the polycondensation reaction conditions such as reaction temperature and reaction time.

[Production of Pigment-Containing Polyester Resin Particles]

The pigment-containing polyester resin particles used in the present invention may be efficiently produced in the form of a pigment water dispersion thereof by a process including the following step 1. In addition, the process may further include a crosslinking step, if required.

Step 1: subjecting a pigment mixture containing the pigment, the polymer a and water, and, if required, further containing a neutralizing agent, a surfactant, etc., to dispersion treatment to obtain the pigment water dispersion of the pigment-containing polyester resin particles.

(Step 1)

The polymer a contains carboxy groups derived from the carboxylic acid component. From the viewpoint of improving storage stability, ejection stability and rub fastness of the resulting pigment water dispersion or water-based ink, it is preferred that the carboxy groups of the polymer a are at least partially neutralized with a neutralizing agent.

When neutralizing the carboxy groups of the polymer a, the neutralization is preferably conducted such that the pH value of the resulting dispersion falls within the range of not less than 7 and not more than 11.

Examples of the neutralizing agent include bases, such as sodium hydroxide, potassium hydroxide, ammonia, various amines, and the like. Among these neutralizing agents, preferred are sodium hydroxide and ammonia. In addition, the polymer a may be previously neutralized.

From the same viewpoint as described above, the equivalent of the neutralizing agent used is preferably not less than 20 mol %, more preferably not less than 40 mol % and even more preferably not less than 50 mol %, and is also preferably not more than 150 mol %, more preferably not more than 120 mol % and even more preferably not more than 100 mol %.

The equivalent of the neutralizing agent used as defined herein may be calculated according to the following formula wherein the polymer a before being neutralized is expressed by a polymer a'.

Equivalent (mol %) of neutralizing agent used=
[{mass (g) of neutralizing agent added/equivalent of neutralizing agent}/[{acid value (mg-KOH/g) of polymer $a$'xmass (g) of polymer $a$'}(56×1,000)]]×100.

The dispersion treatment of the step 1 may be conducted by conventioanlly known metnods. In the dispersion treatment, the pigment particles may be atomized into fine particles having a desired particle size only by substantial dispersion treatment in which a shear stress is applied to the pigment particles. However, it is preferred that the pigment mixture is first subjected to preliminary dispersion treatment, and then further to the substantial dispersion treatment, from the viewpoint of obtaining a uniform pigment water dispersion.

Examples of a disperser used in the preliminary dispersion treatment include ordinarily mixing and stirring devices, such as an anchor blade, a disper blade, etc.

Examples of a disperser used in the substantial dispersion treatment include kneading machines, such as roll mills, kneaders, etc.; high-pressure homogenizers, such as "Microfluidizer", etc.; and media-type dispersers, such as paint shakers, beads mills, etc. Among these dispersers, the high-pressure homogenizers are preferably used from the viewpoint of reducing the particle size of the pigment.

In the case where the dispersion treatment is conducted using the high-pressure homogenizer, by suitably controlling the treating pressure as well as the number of passes through the disperser, it is possible to suitably control the average particle size of the pigment particles in the pigment water dispersion.

From the viewpoint of enhancing productivity and attaining good cost efficiency, the treating pressure used in the dispersion treatment is preferably not less than 60 MPa and not more than 300 MPa, and the number of passes through the disperser is preferably not less than 3 and not more than 30.

In the case where the pigment mixture contains an organic solvent, the organic solvent is removed from the resulting dispersion by conventionally known methods, whereby it is possible to obtain the aforementioned pigment water dispersion.

The solid content of the pigment water dispersion is preferably not less than 10% by mass and more preferably not less than 15% by mass, and is also preferably not more than 40% by mass and more preferably not more than 35% by mass, from the viewpoint of improving dispersion stability of the pigment water dispersion as well as from the viewpoint of facilitating production of the ink. The solid content may be measured by the method described in Examples below.

From the viewpoint of improving storage stability of the pigment water dispersion, the average particle size of the pigment-containing polyester resin particles in the pigment water dispersion is preferably not less than 60 nm, more preferably not less than 70 nm and even more preferably not less than 80 nm, and is also preferably not more than 300 nm, more preferably not more than 200 nm and even more preferably not more than 170 nm.

The average particle size may be measured by the method descried in Examples below.

(Contents of Respective Components in Pigment Water Dispersion)

The contents of the respective components in the pigment water dispersion of the present invention are as follows from the viewpoint of improving storage stability, ejection stability and rub fastness of the resulting pigment water dispersion or water-based ink.

(Content of Pigment)

The content of the pigment in the pigment water dispersion is preferably not less than 2% by mass, more preferably not less than 4% by mass and even more preferably not less than 6% by mass, and is also preferably not more than 20% by mass, more preferably not more than 18% by mass and even more preferably not more than 15% by mass.

The content of the pigment-containing polyester resin particles in the pigment water dispersion is preferably not less than 3% by mass, more preferably not less than 6% by mass and even more preferably not less than 10% by mass, and is also preferably not more than 35% by mass, more preferably not more than 30% by mass and even more preferably not more than 25% by mass.

The content of the polyester resin (polymer a) in the pigment water dispersion is preferably not less than 1% by mass, more preferably not less than 2% by mass and even more preferably not less than 3% by mass, and is also preferably not more than 15% by mass, more preferably not more than 12% by mass and even more preferably not more than 10% by mass.

From the viewpoint of improving dispersion stability of the pigment water dispersion as well as from the viewpoint of facilitating production of the ink, the mass ratio of the pigment to the pigment-containing polyester resin particles (pigment/pigment-containing polyester resin particles) in the pigment water dispersion is preferably not less than 0.2, more preferably not less than 0.3 and even more preferably not less than 0.4, and is also preferably not more than 0.9, more preferably not more than 0.8 and even more preferably not more than 0.7.

The aforementioned mass ratio (pigment/pigment-containing polyester resin particles) may be calculated from the ratio between the amounts of the respective components charged.

[Water-Based Ink for Ink-Jet Printing]

The water-based ink for ink-jet printing according to the present invention contains the pigment water dispersion of the present invention.

The term "water-based" as used herein means that water has a largest content among components of a medium contained in the ink.

The water-based ink of the present invention may be efficiently produced by mixing the above-obtained pigment water dispersion containing the pigment-containing polyester resin particles, an organic solvent and water, if required together with various additives, such as a surfactant, etc.

The method of mixing the respective components as described above is not particularly limited.

<Organic Solvent>

The organic solvent used in the water-based ink is preferably a water-soluble organic solvent that is miscible with water in an optional ratio.

The water-soluble organic solvent may be in the form of either a liquid or a solid as measured at 25° C. However, the water-soluble organic solvent is preferably such a solvent that when dissolving the organic solvent in 100 mL of water at 25° C., the amount of the organic solvent dissolved in the water is not less than 10 mL.

From the viewpoint of improving wet-spreadability of the resulting ink, the boiling point of the water-soluble organic solvent is preferably not lower than 100° C., more preferably not lower than 120° C., even more preferably not lower than 140° C. and further even more preferably not lower than 150° C., and is also preferably not higher than 250° C., more preferably not higher than 245° C., even more preferably not higher than 240° C. and further even more preferably not higher than 235° C.

Examples of the water-soluble organic solvent include glycol ethers, such as alkylene glycol ethers, etc., polyhydric alcohols, such as propylene glycol, etc., amide compounds, and the like. Of these water-soluble organic solvents, preferred are alkylene glycol ethers.

Examples of the alkylene glycol ethers include ethylene glycol monomethyl ether, ethylene glycol monoethyl ether, ethylene glycol monoisopropyl ether, ethylene glycol monobutyl ether, ethylene glycol isobutyl ether, diethylene glycol monomethyl ether, diethylene glycol monoethyl ether, diethylene glycol monoisopropyl ether, diethylene glycol monopropyl ether, diethylene glycol monoisobutyl ether, diethylene glycol monobutyl ether, triethylene glycol monoisobutyl ether, tetraethylene glycol monomethyl ether, propylene glycol monoethyl ether, dipropylene glycol monobutyl ether, dipropylene glycol monomethyl ether, and the like.

Of these alkylene glycol ethers, from the viewpoint of improving wet-spreadability of the resulting ink as well as from the viewpoint of improving rub fastness of the resulting printed material, preferred is at least one compound selected from the group consisting of diethylene glycol monoisobutyl ether, diethylene glycol monobutyl ether, ethylene glycol monomethyl ether, ethylene glycol isobutyl ether, diethylene glycol monomethyl ether and dipropylene glycol monomethyl ether, and more preferred is dipropylene glycol monoisobutyl ether.

Incidentally the organic solvent may include a water-soluble organic solvent whose boiling point is lower than 100° C. or higher than 250° C.

In the present invention, it is preferred that the ink further contains propylene glycol in addition to the alkylene glycol ether.

It is considered that the propylene glycol has the function capable of suppressing evaporation of water mainly from ink nozzles but rapidly volatilizing water after the printing operation to enable formation of a firm coating film of the ink by conducting merely a minimum drying step, and thereby inhibiting a printed surface of the resulting respective printed materials from adhering to a rear-side surface thereof.

The ink of the present invention may also contain a polyhydric alcohol other than those described above, and the like, if required. Examples of the polyhydric alcohol include glycerin, ethylene glycol, butanediol, diethylene glycol, dipropylene glycol, and the like.

<Surfactant>

The ink of the present invention preferably contains a surfactant from the viewpoint of maintaining an adequate surface tension of the ink and improving wettability of the ink to a printing medium.

The surfactant is not particularly limited, and is preferably a nonionic surfactant and more preferably a silicone-based surfactant.

(Silicone-Based Surfactant)

Examples of the silicone-based surfactant include dimethyl polysiloxane, a polyether-modified silicone, an amino-modified silicone, a carboxy-modified silicone, and the like. Of these silicone-based surfactants, from the same viewpoint as described above, preferred is a polyether-modified silicone.

The HLB (hydrophile-lipophile balance) value of the polyether-modified silicone-based surfactant is preferably not less than 2, more preferably not less than 3 and even more preferably not less than 4. The HLB value may be determined by Griffin method.

Specific examples of the polyether-modified silicone include PEG-3 dimethicone, PEG-9 dimethicone, PEG-9 PEG-9 dimethicone, PEG-9 methyl ether dimethicone, PEG-10 dimethicone, PEG-11 methyl ether dimethicone, PEG/PPG-20/22 butyl ether dimethicone, PEG-32 methyl ether dimethicone, PEG-9 polydimethylsiloxyethyl dimethicone, lauryl PEG-9 polydimethylsiloxyethyl dimethicone, and the like.

Specific examples of commercially available products of the polyether-modified silicone include silicones available from Shin-Etsu Chemical Co., Ltd., such as "KF-6011", "KF-6012", "KF-6013", "KF-6015", "KF-6016", "KF-6017", "KF-6028", "KF-6038", "KF-6043", etc.

In the present invention, it is also preferred that an acetylene glycol-based surfactant is used in the ink in addition to the silicone-based surfactant.

Examples of commercially available products of the acetylene glycol-based surfactant include SURFYNOL" series products and "OLFINE" series products both available from Nissin Chemical Co., Ltd., and "ACETYLENOL" series products available from Kawaken Fine Chemicals Co., Ltd., and the like.

The aforementioned surfactants may be used alone or in combination of any two or more thereof.

Examples of the other additives that may be used in the water-based ink of the present invention include a fixing aid, a humectant, a wetting agent, a penetrant, a viscosity controller, a defoaming agent, an antiseptic agent, a mildew-proof agent, a rust preventive, and the like.

Examples of the fixing aid include an emulsion containing water-insoluble polymer particles. Examples of the water-insoluble polymer particles include particles of condensation-based resins, such as polyurethanes, polyesters, etc.; and vinyl-based resins, such as (meth)acrylic resins, styrenebased resins, styrene-(meth)acrylic resins, butadiene-based resins, styrene-butadiene-based resins, vinyl chloride-based resins, vinyl acetate-based resins, acrylic-silicone-based resins, etc.

(Contents of Respective Components in Water-Based Ink of the Present Invention)

The contents of the respective components in the water-based ink of the present invention are as follows from the viewpoint of improving storage stability, ejection stability and rub fastness of the resulting water-based ink.

(Content of Pigment)

The content of the pigment in the water-based ink is preferably not less than 1% by mass, more preferably not less than 2% by mass and even more preferably not less than 2.5% by mass, and is also preferably not more than 15% by mass, more preferably not more than 10% by mass and even more preferably not more than 8% by mass.

The content of the pigment-containing polyester resin particles in the water-based ink is preferably not less than 2% by mass, more preferably not less than 3% by mass and even more preferably not less than 5% by mass, and is also preferably not more than 30% by mass, more preferably not more than 20% by mass and even more preferably not more than 15% by mass.

The content of the polyester resin (polymer a) in the water-based ink is preferably not less than 1% by mass, more preferably not less than 1.5% by mass and even more preferably not less than 2% by mass, and is also preferably not more than 12% by mass, more preferably not more than 10% by mass and even more preferably not more than 6% by mass.

The mass ratio of the pigment to the pigment-containing polyester resin particles (pigment/pigment-containing polyester resin particles) in the water-based ink is preferably not less than 0.2, more preferably not less than 0.3 and even more preferably not less than 0.4, and is also preferably not more than 0.9, more preferably not more than 0.8 and even more preferably not more than 0.7.

The total content of the organic solvents in the water-based ink is preferably not less than 10% by mass, more preferably not less than 20% by mass and even more preferably not less than 30% by mass, and is also preferably not more than 45% by mass, more preferably not more than 42% by mass and even more preferably not more than 40% by mass.

The content of the surfactant in the water-based ink is preferably not less than 0.1% by mass, more preferably not less than 0.2% by mass and even more preferably not less than 0.3% by mass, and is also preferably not more than 3% by mass, more preferably not more than 2% by mass and even more preferably not more than 1% by mass.

The content of water in the water-based ink is preferably not less than 50% by mass, more preferably not less than 54% by mass and even more preferably not less than 58% by mass, and is also preferably not more than 85% by mass, more preferably not more than 80% by mass and even more preferably not more than 75% by mass.

The water-based ink of the present invention may also contain various additives, such as an antiseptic agent, a pH modifier, a viscosity controller, a defoaming agent, a rust preventive, etc., as optional components according to the applications thereof.

(Properties of Water-Based Ink of the Present Invention)

The viscosity of the water-based ink of the present invention as measured at 32° C. is preferably not less than 2 mPa·s and more preferably not less than 2.5 mPa·s, and is also preferably not more than 12 mPa·s, more preferably not more than 9 mPa·s and even more preferably not more than 7 mPa·s, from the viewpoint of improving intermittent ejection properties and substrate-adhesion properties of the resulting ink.

From the viewpoint of improving storage stability of the resulting ink, reducing corrosiveness of the ink, etc., the pH value of the water-based ink of the present invention is preferably not less than 7.0, more preferably not less than 7.2 and even more preferably not less than 7.5, and is also preferably not more than 11, more preferably not more than 10 and even more preferably 9.5.

The water-based ink of the present invention may be loaded into a conventionally known ink-jet printing apparatus, and ejected therefrom in the form of droplets of the ink onto a printing medium, such as a low-water absorbing substrate, etc., so that it is possible to obtain printed images, etc., thereon.

The term "low-water absorbing properties" of the printing medium as used herein is intended to include both concepts of low-liquid absorbing properties and non-liquid absorbing properties, and means that a water absorption of the printing medium is not less than 0 g/m$^2$ and not more than 10 g/m$^2$ as measured under the condition that a contact time between the printing medium and pure water is 100 milliseconds.

As the method of ejecting the droplets of the ink, there may be used any of a piezoelectric method, a thermal method and an electrostatic method. Among these ejection methods, preferred is a piezoelectric method. In the piezoelectric method, the ink droplets are ejected from a number of nozzles communicated with respective pressure chambers by vibrating a wall surface of the respective pressure chambers by means of a piezoelectric element.

Examples of the low-water absorbing printing medium include a low-water absorbing coated paper and a resin film.

Examples of the coated paper include a versatile glossy coated paper, a multi-color foam glossy coated paper, etc.

As the resin film, there may be mentioned a transparent synthetic resin film. Examples of the transparent synthetic resin film include a polyester film, a polyvinyl chloride film, a polypropylene film, a polyethylene film, a nylon film, and the like. These films may be in the form of any of a biaxially oriented film, a monoaxially oriented film and a non-oriented film. Among these films, preferred are a polyester film and an oriented polypropylene film, and more preferred are a polyethylene terephthalate (PET) film subjected to corona discharge treatment, a biaxially oriented polypropylene (OPP) film subjected to corona discharge treatment, and the like.

EXAMPLES

In the following Production Examples, Examples and Comparative Examples, various properties, etc., were measured by the following methods.

(1) Softening Point of Polyester Resin

Using a flow tester "CFT-500D" (tradename) available from Shimadzu Corporation, 1 g of a sample to be measured was extruded through a nozzle having a die pore diameter of 1 mm and a length of 1 mm while heating the sample at a temperature rise rate of 6° C./minute and applying a load of 1.96 MPa thereto by a plunger. The softening point of the polyester resin as the sample to be measured was determined as the temperature at which a half amount of the sample was flowed out when plotting a downward movement of the plunger of the flow tester relative to the temperature.

(2) Glass Transition Temperature (Tg) of Polyester Resin

Using a differential scanning calorimeter "Pyris 6 DSC" (tradename) commercially available from PerkinElmer Co., Ltd., a sample to be measured was heated to 200° C. and then cooled from 200° C. to 0° C. at a temperature drop rate of 10° C./minute, and thereafter heated again at a temperature rise rate of 10° C./minute to prepare an endothermic characteristic curve thereof. The temperature at which an extension of a baseline below an endothermic maximum peak temperature appearing on the curve was intersected with a tangential line having a maximum inclination of the curve in the range of from a rise-up portion to an apex of the peak was read as a glass transition temperature (Tg) of the polyester resin as the sample to be measured.

(3) Acid Value of Polyester Resin

The acid value of the polyester resin was measured by the same neutralization titration method as prescribed in JIS K 0070: 1992 except that only a mixed solvent of ethanol and ether used as a measuring solvent in the method was replaced with a mixed solvent containing acetone and toluene at a volume ratio [acetone:toluene] of 1:1.

(4) Weight-Average Molecular Weight (Mw) of Polyester Resin

A polyester resin as a sample to be measured was dissolved in chloroform to prepare a solution of the polyester resin having a concentration of 0.5 g/100 mL, and the resulting solution was subjected to filtration treatment by passing the solution through a fluororesin filter "FP-200" (tradename) having a pore size of 2 μm available from Sumitomo Electric Industries, Ltd., to remove insoluble components therefrom, thereby preparing a sample solution.

Tetrahydrofuran as an eluent for measurement of a molecular weight of the sample was allowed to flow through analytical columns at a flow rate of 1 mL/minute, and the columns were stabilized in a thermostatic oven at 40° C., and then 100 μL of the aforementioned sample solution was injected into the columns to measure a weight-average molecular weight of the sample.

The weight-average molecular weight of the sample was measured by gel chromatography [GPC apparatus: "CO-8010" and analytical columns: "GMHXL"+"G3000HXL" all available from Tosoh Corporation] and calculated on the basis of a calibration curve previously prepared. The calibration curve of the molecular weight was prepared by using the following several kinds of monodisperse polystyrenes (monodisperse polystyrenes having weight-average molecular weights (Mw) of $2.63 \times 10^3$, $2.06 \times 10^4$ and $1.02 \times 10^5$ all available from Tosoh Corporation as well as monodisperse polystyrenes having weight-average molecular weights (Mw) of $2.10 \times 10^3$, $7.00 \times 10^3$ and $5.04 \times 10^4$ all available from GL Sciences Inc.) as reference standard samples.

(5) Average Particle Size of Pigment Water Dispersion

Using a laser particle analyzing system "ELS-8000" (tradename) available from Otsuka Electrics Co., Ltd., an average particle size of particles in the pigment water dispersion was measured by a dynamic light-scattering method and calculated by cumulant analysis. The measurement was conducted under the conditions including a temperature of 25° C., an angle between incident light and detector of 900 and a cumulative number of 100 times, and a refractive index of water (1.333) was input to the analyzing system as a refractive index of the dispersing solvent. As the sample to measured, there was used a dispersion prepared by adding water to the pigment water dispersion weighed in a screw vial No. 5 available from Maruemu Corporation such that a solid content of the dispersion was adjusted to $2 \times 10^{-4}$% by mass, and stirring the resulting mixture with a magnetic stirrer at 25° C. for 1 hour.

(6) Solid Content

Sodium sulfate dried to a constant weight in a desiccator was weighed in an amount of 10.0 g and charged into a 30 mL polypropylene container ($: 40 mm; height: 30 mm), and 1.0 g of a sample to be measured was added to the container. The contents of the container were mixed and then accurately weighed. The resulting mixture was maintained in the container at 105° C. for 2 hours to remove volatile components therefrom, and further allowed to stand in a desiccator for 15 minutes, followed by measuring a mass thereof. The mass of the sample after removing the volatile components therefrom was regarded as a mass of solids in the sample. The solid content of the sample was calculated by dividing the mass of the solids by the mass of the sample initially added.

(7) pH

The pH value of the ink was measured at 20° C. using a bench-top pH meter "F-71" (tradename) available from Horiba Ltd., equipped with a pH electrode "6337-10D" (tradename) available from Horiba Ltd.

(8) Rate of Increase in Number of Particles in Pigment Water Dispersion

The pigment water dispersion was diluted with ion-exchanged water within one day after production thereof such that a solid content of the dispersion was reduced to 0.25%, and weighed in a screw vial "Model No. 5" available from Maruemu Corporation, and the resulting diluted dispersion was stirred with a magnetic stirrer at 25° C. for 1 hour to thereby obtain a pigment water dispersion (a). The thus obtained pigment water dispersion (a) was injected into a dynamic light scattering particle size distribution measuring apparatus "AccuSizer 780APS" (tradename) available from Nihon Entegris G.K., using a 5 mL syringe to count the number of particles in the dispersion at 25° C. by a particle counting method.

The particle sizes measured by the particle counting method were in the range of from 0.51 μm to 483.42 μm.

The number of coarse particles in the pigment water dispersion was calculated in terms of the number of particles having a particle size of not less than 0.5 μm per 1 mL of the pigment water dispersion having a solid content of 20%.

Successively, the pigment water dispersion that had been allowed to stand for 6 months at room temperature was diluted with ion-exchanged water in the same manner as described above to thereby obtain a pigment water dispersion (β). The number of the particles in the thus obtained pigment water dispersion (β) was measured by the same method as described above.

The rate (%) of increase in number of the particles was calculated according to the following formula.

Rate (%) of increase in number of particles=[[number of particles having a particle size of not less than 0.5 μm per 1 mL of pigment water dispersion (β) having solid content of 20%]/[number of particles having a particle size of not less than 0.5 μm per 1 mL of pigment water dispersion (α) having solid content of 20%]−1]×100

[Evaluation Ratings]

5: The rate of increase in number of the particles was less than 5%.

4: The rate of increase in number of the particles was not less than 5% and less than 10%.

3: The rate of increase in number of the particles was not less than 10% and less than 100%.

2: The rate of increase in number of the particles was not less than 100% and less than 1000%.
1: The rate of increase in number of the particles was not less than 1000%.

The smaller the rate of increase in number of the particles became, the more excellent the storage stability of the pigment water dispersion was. If the evaluation rating is 4 or 5, the amount of the coarse particles in the pigment water dispersion would cause no significant problem upon practical use.

Production Examples 1 to 4 and 7 and Comparative Production Example 1

(Production of Polyester Resins P1 to P4, P7 and P11)

A 10 L four-necked flask equipped with a thermometer, a stainless steel stirring rod, a flow-down type condenser with a dehydration tube and a nitrogen inlet tube was charged with the respective raw material monomers other than trimellitic anhydride (TMA) (alcohol component and carboxylic acid component) and an esterification catalyst (tin (II) 2-ethyl hexanoate) as shown in Table 1. The contents of the flask were heated to 185° C. using a mantle heater in a nitrogen atmosphere while stirring to conduct the reaction therebetween for 5 hours, and then heated stepwise to 220° C. at a rate of 5° C./hour, followed by further reducing an inside pressure of the flask to 8.3 kPa at which the contents of the flask were maintained for 1 hour.

Thereafter, the contents of the flask were cooled to 200° C., and after the pressure within the flask was returned to atmospheric pressure, trimellitic anhydride (TMA) was added to the flask. The contents of the flask were heated to 220° C. and maintained at 220° C. for 1 hour, and then the inside pressure of the flask was further reduced to allow the contents of the flask to react with each other until a softening point of the resulting polymer as measured under 8.3 kPa reached the temperature shown in Table 1, thereby obtaining polyester resins P1 to P4, P7 and P11. The results are shown in Table 1.

Production Example 5 (Production of Polyester Resin P5)

In the same manner as in Production Example 1, the flask was charged with the respective raw material monomers (alcohol component and carboxylic acid component) and the esterification catalyst (tin (II) 2-ethyl hexanoate) as shown in Table 1. The contents of the flask were heated to 185° C. using a mantle heater in a nitrogen atmosphere while stirring to conduct the reaction therebetween for 5 hours, and then heated stepwise to 235° C. at a rate of 5° C./hour. Thereafter, the inside pressure of the flask was further reduced to allow the contents of the flask to react with each other until a softening point of the resulting polymer as measured under 8.3 kPa reached the temperature shown in Table 1, thereby obtaining a polyester resin P5.

Production Example 6 (Production of Polyester Resin P6)

In the same manner as in Production Example 1, the flask was charged with the respective raw material monomers other than trimellitic anhydride (TMA) (alcohol component and carboxylic acid component) and the esterification catalyst (tin (II) 2-ethyl hexanoate) as shown in Table 1. The contents of the flask were heated to 185° C. using a mantle heater in a nitrogen atmosphere while stirring to conduct the reaction therebetween for 5 hours, and then heated stepwise to 235° C. at a rate of 5° C./hour, followed by further reducing an inside pressure of the flask to 8.3 kPa at which the contents of the flask were maintained for 1 hour.

Thereafter, the contents of the flask were cooled to 200° C., and after the pressure within the flask was returned to atmospheric pressure, trimellitic anhydride (TMA) was added to the flask. The contents of the flask were heated to 220° C. and maintained at 220° C. for 1 hour, and then the inside pressure of the flask was further reduced to allow the contents of the flask to react with each other until a softening point of the resulting polymer as measured under 8.3 kPa reached the temperature shown in Table 1, thereby obtaining a polyester resin P6. The results are shown in Table 1.

Comparative Production Examples 2 and 3 (Production of Polyester Resins P12 and P13)

In the same manner as in Production Example 1, the flask was charged with the respective raw material monomers other than trimellitic anhydride (TMA) and fumaric acid (FA) (alcohol component and carboxylic acid component) and the esterification catalyst (tin (II) 2-ethyl hexanoate) as shown in Table 1. The contents of the flask were heated to 185° C. using a mantle heater in a nitrogen atmosphere while stirring to conduct the reaction therebetween for 5 hours, and then heated stepwise to 220° C. at a rate of 5° C./hour, followed by further reducing the inside pressure of the flask to 8.3 kPa at which the contents of the flask were maintained for 1 hour.

Thereafter, the contents of the flask were cooled to 200° C., and after the pressure within the flask was returned to atmospheric pressure, trimellitic anhydride (TMA) and fumaric acid (FA) were added to the flask. The contents of the flask were heated to 220° C. and maintained at 220° C. for 1 hour, and then the inside pressure of the flask was further reduced to allow the contents of the flask to react with each other until a softening point of the resulting polymer as measured under 8.3 kPa reached the temperature shown in Table 1, thereby obtaining polyester resins P12 and P13. The results are shown in Table 1.

The details of the respective components shown in Table 1 are as follows.

(Alcohol Component)
  BPA-PO: Propyleneoxide adduct (average molar number of addition of propyleneoxide: 4 mol) of bisphenol (2,2-bis(4-hydroxyphenyl) propane)
  2,3-BD: 2,3-Butanediol
  2,5-HD: 2,5-Hexanediol
  1,4-CHD: 1,4-Cyclohexanediol
  HBPA: Hydrogenated bisphenol A
  1,2-PD: 1,2-Propanediol
(Carboxylic Acid Component)
  TPA: Terephthalic acid
  FA: Fumaric acid
  APA: Adipic acid
  TMA: Trimellitic anhydride

TABLE 1

| | | | | Production Examples | | | | | | | | | |
|---|---|---|---|---|---|---|---|---|---|---|---|---|---|
| | | | | 1 | | 2 | | 3 | | 4 | | 5 | |
| | | | | Kind of polyester resin | | | | | | | | | |
| | | | | P1 | | P2 | | P3 | | P4 | | P5 | |
| | | | | Amounts of respective components charged*[1] | | | | | | | | | |
| | | | | g | mol % | g | mol % | g | mol % | g | mol % | g | mol % |
| Composition of monomers | Alcohol component | Compound (I)*[2] | BPA-PO | 0 | 80 | 0 | 50 | 0 | 80 | 0 | 100 | | |
| | | Compound (II)*[3] | 2,3-BD | | | | | | | | | | |
| | | | 2,5-HD | | | | | 0 | 20 | | | | |
| | | | 1,4-CHD | | | | | | | | | | |
| | | | HBPA | | | | | | | | | 0 | 100 |
| | Others | | 1,2-PD | 0 | 20 | 0 | 50 | | | | | | |
| | Carboxylic acid component | | TPA | 0 | 80 | 0 | 80 | 0 | 80 | 0 | 66 | 0 | 70 |
| | | | FA | | | | | | | | | | |
| | | | APA | | | | | | | 0 | 14 | | |
| | | | TMA | 0 | 4 | 0 | 4 | 0 | 4 | 0 | 5 | | |
| Catalyst: Tin (II) 2-ethyl hexanoate | | | | 50 | | 50 | | 50 | | 50 | | 40 | |
| Properties of polyester resin | Softening point (° C.) | | | 143 | | 140 | | 141 | | 119 | | 138 | |
| | Glass transition temperature (° C.) | | | 61 | | 74 | | 54 | | 66 | | 92 | |
| | Acid value (mgKOH/g) | | | 20 | | 18 | | 19 | | 22 | | 23 | |
| | Weight-average molecular weight | | | 41700 | | 52300 | | 45300 | | 13400 | | 12500 | |

| | | | | Production Examples | | | | Comparative Examples | | | | | |
|---|---|---|---|---|---|---|---|---|---|---|---|---|---|
| | | | | 6 | | 7 | | 1 | | 2 | | 3 | |
| | | | | Kind of polyester resin | | | | | | | | | |
| | | | | P6 | | P7 | | P11 | | P12 | | P13 | |
| | | | | Amounts of respective components charged*[1] | | | | | | | | | |
| | | | | g | mol % | g | mol % | g | mol % | g | mol % | g | mol % |
| Composition of monomers | Alcohol component | Compound (I)*[2] | BPA-PO | | | 0 | 5 | | | 0 | 10 | 0 | 30 |
| | | Compound (II)*[3] | 2,3-BD | | | 0 | 95 | 0 | 40 | 0 | 90 | | |
| | | | 2,5-HD | | | | | | | | | | |
| | | | 1,4-CHD | 0 | 50 | | | | | | | | |
| | | | HBPA | 0 | 50 | | | | | | | | |
| | Others | | 1,2-PD | | | | | 0 | 60 | | | 0 | 70 |
| | Carboxylic acid component | | TPA | 0 | 80 | 0 | 80 | 0 | 80 | 0 | 60 | 0 | 70 |
| | | | FA | | | | | | | 0 | 30 | 0 | 30 |
| | | | APA | | | | | | | | | | |
| | | | TMA | 0 | 4 | 0 | 4 | 0 | 4 | 0 | 12 | 0, | 4 |
| Catalyst: Tin (II) 2-ethyl hexanoate | | | | 50 | | 50 | | 30 | | 40 | | 40 | |
| Properties of polyester resin | Softening point (° C.) | | | 138 | | 140 | | 140 | | 122 | | 118 | |
| | Glass transition temperature (° C.) | | | 92 | | 63 | | 78 | | 68 | | 70 | |
| | Acid value (mgKOH/g) | | | 23 | | 25 | | 14.5 | | 31 | | 24 | |
| | Weight-average molecular weight | | | 36700 | | 15000 | | 66000 | | 20700 | | 19200 | |

Note
*[1]Molar number on the basis of 100 moles of a whole amount of the alcohol component
*[2]Compound (I) represented by the formula (I)
*[3]Compound (II) containing two secondary hydroxy groups

Example I-1 (Preparation of Pigment Water Dispersion 1)

(1) Step 1 (Pigment Dispersing Step)

In a 2 L-capacity container, 66.7 g of the polyester resin P1 was dissolved in 198.6 g of methyl ethyl ketone (MEK). A 5N sodium hydroxide aqueous solution was added to the resulting polymer solution such that 85 mol % of an acid value of the polyester resin P1 was neutralized, and 390.5 g of ion-exchanged water was further added dropwise thereto over 30 minutes. The resulting mixed solution was stirred and mixed in a temperature range of from 10 to 15° C. using a disper blade operated at 1,500 r/min for 15 minutes.

Successively, 100 g of carbon black "MONARCH 717" (tradename) available from Cabot Corporation was added to the obtained reaction solution, and the resulting mixture was stirred and mixed in a temperature range of from 10 to 15° C. using a disper blade operated at 6,500 r/min for 2 hours to obtain a preliminary dispersion.

The thus obtained preliminary dispersion was subjected to filtration treatment through a 200-mesh filter, and then diluted by adding 36.1 g of ion-exchanged water thereto. Thereafter, the resulting diluted dispersion was subjected to dispersion treatment under a pressure of 150 MPa using a Microfluidizer "M-110EH-30XP" (high-pressure homogenizer) available from Microfluidics Corporation by passing the dispersion through the device 15 times, thereby obtaining a pigment water dispersion liquid of pigment-containing polyester resin particles.

(2) Step 2 (Concentration Step)

A 2 L eggplant-shaped flask was charged with the whole amount of the pigment water dispersion liquid obtained in the step 1, and then ion-exchanged water was added thereto such that a solid content of the dispersion liquid was adjusted to 15%. The resulting dispersion was maintained under a pressure of 0.09 MPa (abs) in a warm water bath adjusted to 32° C. for 3 hours using a rotary distillation apparatus "Rotary Evaporator N-1000S" available from Tokyo Rikakikai Co., Ltd., operated at a rotating speed of 50 r/min to remove the organic solvent therefrom. Furthermore, the temperature of the warm water bath was adjusted to 62° C., and the pressure in the apparatus was reduced to 0.07 MPa (abs), and the resulting reaction solution was concentrated under this condition until a solid content of the reaction solution became 25%, thereby obtaining a concentrated solution.

The thus obtained concentrated solution was charged into a 500 mL angle rotor, and subjected to centrifugal separation using a centrifugal separator (high-speed cooling centrifuge "himac CR22G" available from Hitachi Koki Co., Ltd.; temperature set: 20° C.) at 3,660 r/min for 20 minutes. Thereafter, the liquid layer portion thus separated was subjected to filtration treatment through a membrane filter "Minisart" having a pore size of 5 μm available from Sartorius Inc., and then the resulting filtered product was diluted with water such that a solid content thereof was adjusted to 22%, thereby obtaining a pigment water dispersion 1 of the pigment-containing polyester resin particles (pigment content: 13.2%; polyester resin content: 8.8%). The rate of increase in number of the particles in the thus obtained pigment water dispersion 1 is shown in Table 2.

Examples I-2 to I-12 and Comparative Examples I-1 to I-3

The same procedure as in Example I-1 was repeated except that the polyester resin and the pigment used therein were replaced with those shown in Table 2, thereby obtaining pigment water dispersions 2 to 12 and 21 to 23 of the pigment-containing polyester resin particles. The results are shown in Table 2.

Reference Example 1 (Preparation of Pigment Water Dispersion 24)

(1) Step 1 (Pigment Dispersing Step)

In a 2 L-capacity container, 266.7 g of a water-dispersible polyester resin "VYLONAL MD-1480" (glass transition temperature: 20° C.; acid value: 3 mgKOH/g; number-average molecular weight: 15000; solid content: 25%) available from TOYOBO Co., Ltd., was dissolved in 198.6 g of MEK. Moreover, 190.5 g of ion-exchanged water was further added dropwise to the obtained solution over 30 minutes. The resulting mixed solution was stirred and mixed in a temperature range of from 10 to 15° C. using a disper blade operated at 1,500 r/min for 15 minutes.

Successively, 100 g of carbon black "MONARCH 717" (tradename) available from Cabot Corporation was added to the obtained reaction solution, and the resulting mixture was stirred and mixed in a temperature range of from 10 to 15° C. using a disper blade operated at 6,500 r/min for 2 hours to obtain a preliminary dispersion.

The thus obtained preliminary dispersion was subjected to filtration treatment through a 200-mesh filter, and then diluted by adding 36.1 g of ion-exchanged water thereto. Thereafter, the resulting diluted dispersion was subjected to dispersion treatment under a pressure of 150 MPa using a Microfluidizer "M-110EH-30XP" by passing the dispersion through the device 15 times, thereby obtaining a pigment water dispersion liquid of pigment-containing polyester resin particles.

Subsequently, the same procedure as in the step 2 (concentration step) of Example I-1 was conducted except for using the thus obtained pigment water dispersion liquid, thereby obtaining a pigment water dispersion 24 of the pigment-containing polyester resin particles. The results are shown in Table 2.

TABLE 2

| | | | Polyester Resin | Pigment | Content of pigment (%) | Content of resin (%) | Average particle size (nm) | pH | Rate of increase in number of particles (%) |
|---|---|---|---|---|---|---|---|---|---|
| Examples | I-1 | Pigment water dispersion 1 | Polyester resin P1 | Carbon black ("MONARCH 717" available from Cabot Corporation) | 13.2 | 8.8 | 92 | 7.5 | 4 |
| | I-2 | Pigment water dispersion 2 | Polyester resin P2 | Carbon black ("MONARCH 717" available from Cabot Corporation) | 13.2 | 8.8 | 95 | 7.8 | 4 |
| | I-3 | Pigment water dispersion 3 | Polyester resin P3 | Carbon black ("MONARCH 717" available from Cabot Corporation) | 13.2 | 8.8 | 93 | 7.8 | 4 |
| | I-4 | Pigment water dispersion 4 | Polyester resin P4 | Carbon black ("MONARCH 717" available from Cabot Corporation) | 13.2 | 8.8 | 92 | 7.6 | 5 |
| | I-5 | Pigment water dispersion 5 | Polyester resin P5 | Carbon black ("MONARCH 717" available from Cabot Corporation) | 13.2 | 8.8 | 97 | 7.5 | 5 |
| | I-6 | Pigment water dispersion 6 | Polyester resin P6 | Carbon black ("MONARCH 717" available from Cabot Corporation) | 13.2 | 8.8 | 92 | 7.6 | 4 |
| | I-7 | Pigment water dispersion 7 | Polyester resin P7 | Carbon black ("MONARCH 717" available from Cabot Corporation) | 13.2 | 8.8 | 97 | 7.8 | 4 |
| | I-8 | Pigment water dispersion 8 | Polyester resin P5 | Carbon black ("MONARCH 800" available from Cabot Corporation) | 13.2 | 8.8 | 91 | 7.6 | 5 |
| | I-9 | Pigment water dispersion 9 | Polyester resin P5 | C.I. Pigment Blue 15:3 ("CFB6338JC" available from Dainichiseika Color & Chemicals Mfg. Co., Ltd.) | 13.2 | 8.8 | 92 | 7.5 | 5 |
| | I-10 | Pigment water dispersion 10 | Polyester resin P5 | C.I. Pigment Red 150 ("FFC 522-1D" available from Fuji Pigment Co., Ltd.) | 13.2 | 8.8 | 151 | 7.7 | 5 |
| | I-11 | Pigment water dispersion 11 | Polyester resin P5 | C.I. Pigment Yellow 155 ("IJY4GC" available from Clariant AG) | 13.2 | 8.8 | 152 | 7.5 | 5 |

TABLE 2-continued

|  |  | Polyester Resin | Pigment | Content of pigment (%) | Content of resin (%) | Average particle size (nm) | pH | Rate of increase in number of particles (%) |
|---|---|---|---|---|---|---|---|---|
|  | I-12 | Pigment water dispersion 12 | Polyester resin P5 | C.I. Pigment Red 122 ("CFR6111T" available from Dainichiseika Color & Chemicals Mfg. Co., Ltd.) | 13.2 | 8.8 | 102 | 7.6 | 5 |
| Comparative Examples | I-1 | Pigment water dispersion 21 | Polyester resin P11 | Carbon black ("MONARCH 717" available from Cabot Corporation) | 13.2 | 8.8 | 123 | 7.3 | 3 |
|  | I-2 | Pigment water dispersion 22 | Polyester resin P12 | Carbon black ("MONARCH 717" available from Cabot Corporation) | 13.2 | 8.8 | 92 | 7.6 | 3 |
|  | I-3 | Pigment water dispersion 23 | Polyester resin P13 | Carbon black ("MONARCH 717" available from Cabot Corporation) | 13.2 | 8.8 | 96 | 7.4 | 2 |
| Reference Example 1 |  | Pigment water dispersion 24 | "VYLONAL MD-1480" | Carbon black ("MONARCH 717" available from Cabot Corporation) | 13.2 | 8.8 | 143 | 7.6 | 1 |

From the results shown in Table 2, it was confirmed that the pigment water dispersions obtained in the Examples had a less rate of increase in number of the particles therein and were excellent in storage stability, and the amount of coarse particles contained in the pigment water dispersion posed no significant problem upon practical use, as compared to the pigment water dispersions obtained in the Comparative Examples.

Examples II-1 to II-12 and Comparative Examples II-1 to II-3 (Production of Water-Based Inks)

The respective pigment water dispersions obtained above, an organic solvent, a surfactant and ion-exchanged water as shown in Table 3 below were mixed with each other, and the resulting mixed solution was subjected to filtration treatment through a membrane filter "Minisart" having a pore size of 5 μm available from Sartorius Inc., thereby obtaining water-based inks 1 to 12 and 21 to 23.

The details of the respective components shown in Table 3 are as follows.
(Organic Solvent)
  iBDG: Diethylene glycol monoisobutyl ether
  PG: Propylene glycol
(Surfactant)
  KF-6011: Silicone-based surfactant available from Shin-Etsu Chemical Co., Ltd.

The resulting water-based inks were evaluated with respect to ejection stability and rub fastness thereof by the following methods. The results are shown in Table 3.
<Ejection Stability after Allowing Ink to Stand for a Long Period of Time>

The respective water-based inks were loaded into an ink-jet printer "IPSIO SG 2010L" available from Ricoh Company, Ltd., and a nozzle check pattern was printed on a plain paper using the ink-jet printer to confirm that no missing nozzles were present in the ink-jet printer. Thereafter, the ink-jet printer was allowed to stand in such a state as filled with the ink at room temperature (25° C.) and a humidity of 50% for 2 days. After the elapse of 2 days, the nozzle check pattern was printed again on a plain paper using the ink-jet printer, and visually observed to measure and count the number of missing nozzles in the ink-jet printer.

In the case where the number of missing nozzles thus measured above was not less than 11, the ink-jet printer was subjected to cleaning treatment, and then the nozzle check pattern was printed again on a plain paper using the ink-jet printer to measure and count the number of missing nozzles therein. The aforementioned procedure was repeated until the number of missing nozzles in the ink-jet printer was reduced to 10 or less.
[Evaluation Ratings]
  5: The number of missing nozzles was 10 or less when measured on the first nozzle check pattern.
  4: The number of missing nozzles was reduced to 10 or less after conducting the first cleaning treatment.
  3: The number of missing nozzles was reduced to 10 or less after conducting the second cleaning treatment.
  2: The number of missing nozzles was reduced to 10 or less after conducting the third cleaning treatment.
  1: The number of missing nozzles was more than 10 even after conducting the third cleaning treatment.

If the evaluation rating is 4 or 5, the ink can exhibit sufficient ejection stability.
<Rub Fastness>

The respective water-based inks were loaded into an ink-jet printer "IPSIO SG 2010L" available from Ricoh Company, Ltd., equipped with a rubber heater, and a solid image was printed on a polyethylene terephthalate (PET) film "LUMIRROR (registered trademark) T60 #75" (water absorption: 2.3 g/m$^2$) available from Toray Industries Inc., which had been heated to 60° C., using the ink-jet printer. The resulting printed material was placed on a hot plate heated to 60° C. and dried thereon for 3 minutes, and then cooled to 25° C., thereby obtaining a PET film printed material for evaluation.

The resulting printed material for evaluation was used to evaluate rub fastness thereof.

The printed surface of the resulting printed material was rubbed with a cellulose nonwoven fabric "BEMCOT (registered trademark) M3-II" available from Asahi Kasei Fiber K.K., by reciprocatively moving the nonwoven fabric over the printed surface 50 times while applying a load of 100 g/cm$^2$ thereto.

The printed surface after being rubbed with the nonwoven fabric was visually observed to examine occurrence of damage (flaws) thereon, and the rub fastness of the printed material was evaluated according to the following evaluation ratings.
[Evaluation Ratings]
  5: No flaws were present on the printed surface, and no deterioration in gloss was recognized.
  4: No flaws were present on the printed surface, but deterioration in gloss was recognized by visual observation.
  3: Flaws were present on the printed surface, but the surface of the underlying film was not exposed thereto.

2: The printed surface suffered from peeling, and the surface of the underlying film was exposed thereto such that an area of the exposed surface of the film was less than 50% of the printed image portion.

1: The printed surface suffered from peeling, and the surface of the underlying film was exposed thereto such that an area of the exposed surface of the film was not less than 50% of the printed image portion.

It is indicated that as the evaluation rating value was increased, the flaws formed on the printed surface was reduced, and the printed material was more excellent in rub fastness. When the evaluating rating is 4 or 5, the printed material can exhibit sufficient rub fastness.

From the results shown in Table 3, it was confirmed that the water-based inks obtained in the Examples were excellent in ejection stability upon ink-jet printing, and capable of providing ink-jet printed materials having excellent rub fastness, as compared to the water-based inks obtained in the Comparative Examples.

INDUSTRIAL APPLICABILITY

According to the present invention, it is possible to provide a pigment water dispersion that is excellent in storage stability, and a water-based ink for ink-jet printing which is excellent in ejection stability after allowing the ink

TABLE 3

| | | Examples | | | | | | | | Examples | | | | Comparative Examples | | |
|---|---|---|---|---|---|---|---|---|---|---|---|---|---|---|---|---|
| | | II-1 | II-2 | II-3 | II-4 | II-5 | II-6 | II-7 | II-8 | II-9 | II-10 | II-11 | II-12 | II-1 | II-2 | II-3 |
| Water-based ink | | 1 | 2 | 3 | 4 | 5 | 6 | 7 | 8 | 9 | 10 | 11 | 12 | 21 | 22 | 23 |
| Composition of water-based ink formulated (% by mass) | Pigment water dispersion 1 | 30.3 | | | | | | | | | | | | | | |
| | Pigment water dispersion 2 | | 30.3 | | | | | | | | | | | | | |
| | Pigment water dispersion 3 | | | 30.3 | | | | | | | | | | | | |
| | Pigment water dispersion 4 | | | | 30.3 | | | | | | | | | | | |
| | Pigment water dispersion 5 | | | | | 30.3 | | | | | | | | | | |
| | Pigment water dispersion 6 | | | | | | 30.3 | | | | | | | | | |
| | Pigment water dispersion 7 | | | | | | | 30.3 | | | | | | | | |
| | Pigment water dispersion 8 | | | | | | | | 30.3 | | | | | | | |
| | Pigment water dispersion 9 | | | | | | | | | 30.3 | | | | | | |
| | Pigment water dispersion 10 | | | | | | | | | | 30.3 | | | | | |
| | Pigment water dispersion 11 | | | | | | | | | | | 30.3 | | | | |
| | Pigment water dispersion 12 | | | | | | | | | | | | 30.3 | | | |
| | Pigment water dispersion 21 | | | | | | | | | | | | | 30.3 | | |
| | Pigment water dispersion 22 | | | | | | | | | | | | | | 30.3 | |
| | Pigment water dispersion 23 | | | | | | | | | | | | | | | 30.3 |
| | Organic solvent: iBDG | 5 | 5 | 5 | 5 | 5 | 5 | 5 | 5 | 5 | 5 | 5 | 5 | 5 | 5 | 5 |
| | Organic solvent: PG | 30 | 30 | 30 | 30 | 30 | 30 | 30 | 30 | 30 | 30 | 30 | 30 | 30 | 30 | 30 |
| | Surfactant: "KF-6011" | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | Ion exchanged water | Bal.** | Bal.** | Bal.** | Bal.** | Bal.** | Bal.** | Bal.** | Bal.** | Bal.** | Bal.** | Bal.** | Bal.** | Bal.** | Bal.** | Bal.** |
| Evaluation results | Average particle size (nm) | 92 | 95 | 93 | 92 | 97 | 92 | 97 | 91 | 92 | 151 | 152 | 102 | 123 | 92 | 96 |
| | Ejection stability after allowing ink to stand for long period of time | 4 | 4 | 4 | 5 | 5 | 4 | 4 | 5 | 5 | 5 | 5 | 5 | 2 | 3 | 2 |
| | Rub fastness | 4 | 4 | 5 | 5 | 5 | 5 | 4 | 5 | 5 | 5 | 5 | 5 | 4 | 5 | 3 |

Note
**Balance to stand for a long period of time, and is capable of providing a printed material having excellent rub fastness. The pigment water dispersion of the present invention is useful, in particular, for use in a water-based ink for ink-jet printing. In addition, the water-based ink of the present invention is useful, in particular, for ink-jet printing.

The invention claimed is:

1. A pigment water dispersion comprising pigment-containing polyester resin particles, wherein:
   an alcohol component as a raw material monomer of the polyester resin satisfies the following conditions 1 and 2,
   Condition 1: a content of a compound (I) represented by the following formula (I) in the alcohol component is not more than 7 mol %,

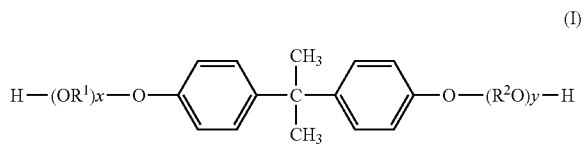

(I)

wherein $OR^1$ and $R^2O$ are each independently an oxyalkylene group comprising not less than 1 and not more than 4 carbon atoms, and x and y are each independently a positive number of not less than 0; and
   Condition 2: a content of a compound (II) comprising two secondary hydroxy groups except for the compound (I) in the alcohol component is not less than 45 mol %.

2. The pigment water dispersion according to claim 1, wherein the alcohol component comprises no compound (I).

3. The pigment water dispersion according to claim 1, wherein the compound (II) is at least one compound selected from the group consisting of 2,3-butanediol, 2,5-hexanediol, 1,4-cyclohexanediol and hydrogenated bisphenol A.

4. The pigment water dispersion according to claim 1, wherein a content of the compound (II) in the alcohol component is not less than 80 mol %.

5. The pigment water dispersion according to claim 1, wherein a carboxylic acid component as a raw material monomer of the polyester resin is at least one compound selected from the group consisting of an aromatic dicarboxylic acid, an aliphatic dicarboxylic acid and a trivalent or higher-valent polycarboxylic acid.

6. The pigment water dispersion according to claim 5, wherein the aromatic dicarboxylic acid is at least one compound selected from the group consisting of phthalic acid, isophthalic acid and terephthalic acid.

7. The pigment water dispersion according to claim 5, wherein the aliphatic dicarboxylic acid is at least one compound selected from the group consisting of unsaturated aliphatic dicarboxylic acid and a saturated aliphatic dicarboxylic acid.

8. The pigment water dispersion according to claim 5, wherein the trivalent or higher-valent polycarboxylic acid is at least one compound selected from the group consisting of trimellitic acid, pyromellitic acid and trimellitic anhydride.

9. The pigment water dispersion according to claim 5, wherein the carboxylic acid component includes a combination of an aromatic dicarboxylic acid and a trivalent or higher-valent polycarboxylic acid.

10. The pigment water dispersion according to claim 1, wherein an acid value of the polyester resin is not less than 10 mgKOH/g and not more than 100 mgKOH/g.

11. The pigment water dispersion according to claim 1, wherein a glass transition temperature of the polyester resin is not lower than 50° C. and not higher than 100° C.

12. The pigment water dispersion according to claim 1, wherein an average particle size of the pigment-containing polyester resin particles is not less than 60 nm and not more than 300 nm.

13. The pigment water dispersion according to claim 1, wherein a content of the pigment-containing polyester resin particles in the pigment water dispersion is not less than 3% by mass and not more than 35% by mass.

14. The pigment water dispersion according to claim 1, wherein a mass ratio of the pigment to the pigment-containing polyester resin particles (pigment/pigment-containing polyester resin particles) in the pigment water dispersion is not less than 0.2 and not more than 0.9.

15. A water-based ink for ink-jet printing, comprising the pigment water dispersion according to claim 1.

16. The water-based ink for ink-jet printing according to claim 15, further comprising an alkylene glycol ether and propylene glycol as organic solvents.

17. The pigment water dispersion according to claim 1, wherein a softening point of the polyester resin is not lower than 90° C. and not higher than 180° C.

18. The pigment water dispersion according to claim 1, wherein a weight-average molecular weight of the polyester resin is not less than 5,000 and not more than 100,000.

19. The pigment water dispersion according to claim 1, further comprising a surfactant.

20. The pigment water dispersion according to claim 19, wherein the surfactant is a silicone-based surfactant.

* * * * *